Figure 1:
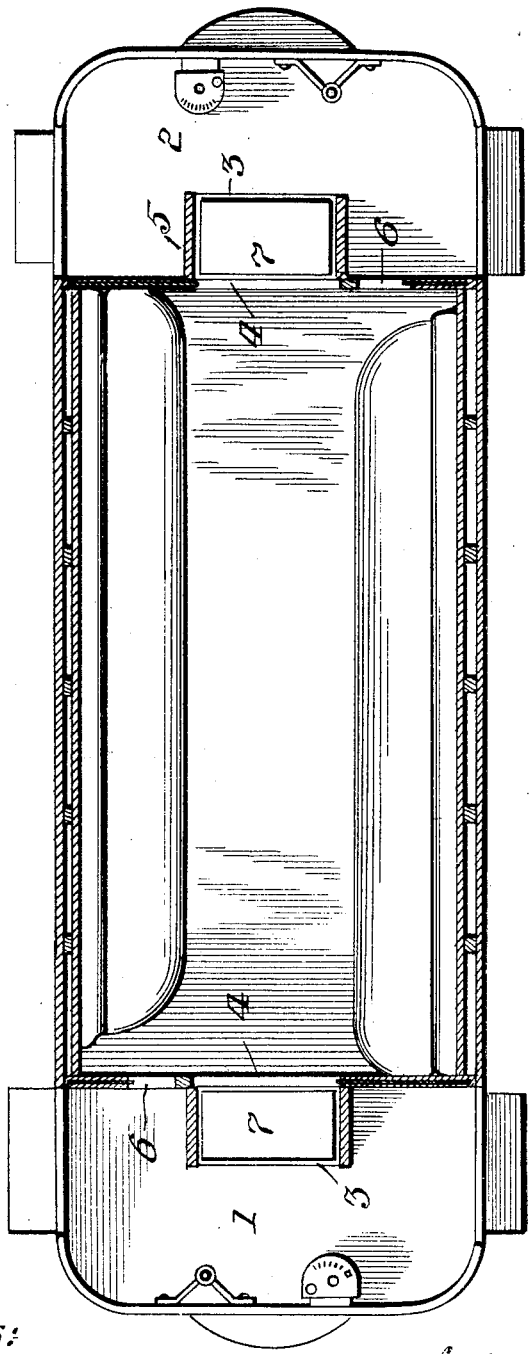

No. 777,054. PATENTED DEC. 6, 1904.
V. ANTONY.
STREET CAR INDICATING OR RECORDING MECHANISM.
APPLICATION FILED NOV. 28, 1903.
NO MODEL. 2 SHEETS—SHEET 1.

Witnesses:

Inventor
Victor Antony
By
Attorneys.

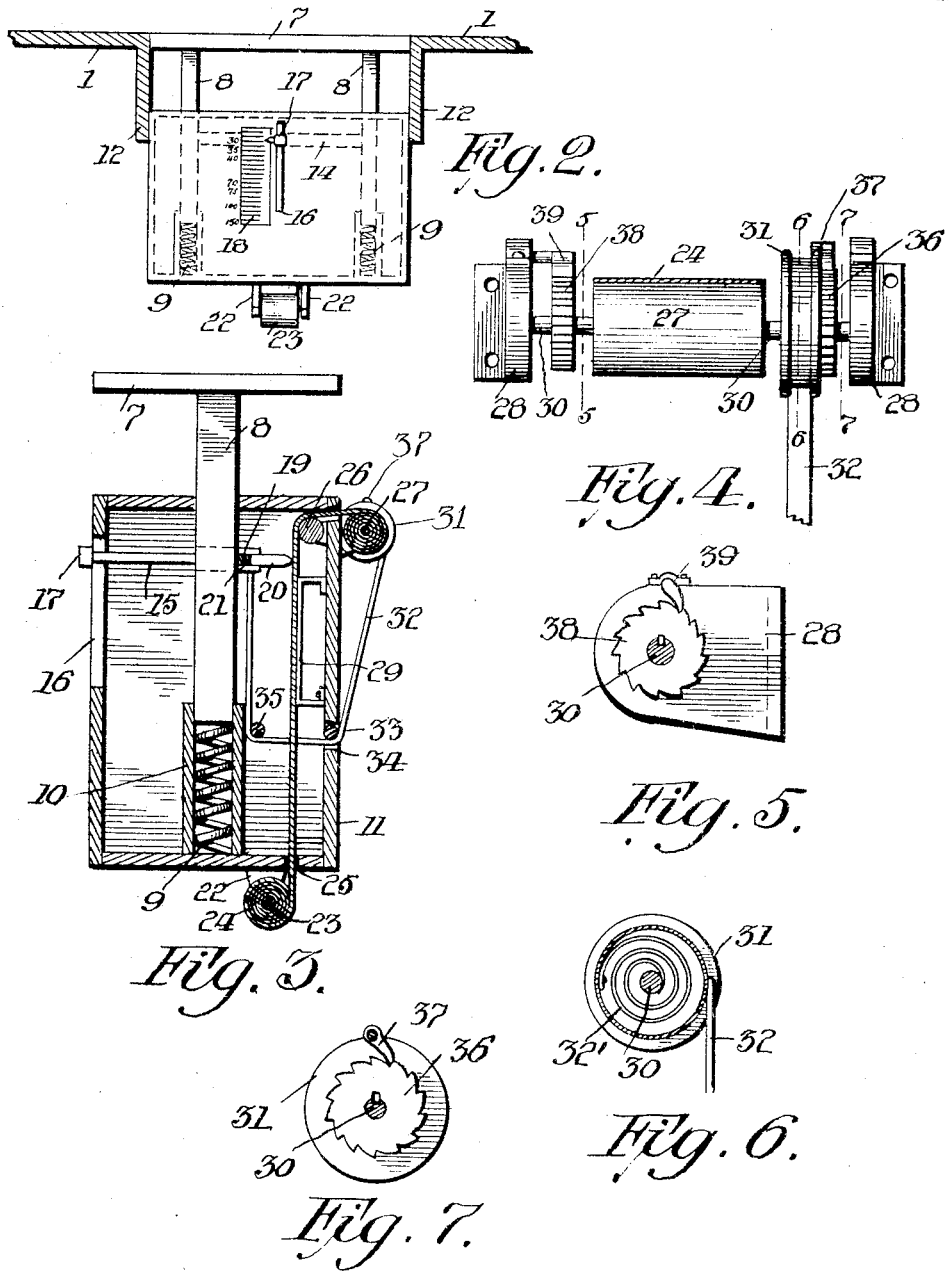

No. 777,054.

Patented December 6, 1904.

UNITED STATES PATENT OFFICE.

VICTOR ANTONY, OF HOMESTEAD, PENNSYLVANIA.

STREET-CAR INDICATING OR RECORDING MECHANISM.

SPECIFICATION forming part of Letters Patent No. 777,054, dated December 6, 1904.

Application filed November 28, 1903. Serial No. 182,973. (No model.)

*To all whom it may concern:*

Be it known that I, VICTOR ANTONY, a subject of the Emperor of Austria-Hungary, residing at Homestead, in the county of Allegheny and State of Pennsylvania, have invented certain new and useful Improvements in Street-Car Indicating or Registering Mechanism, of which the following is a specification, reference being had therein to the accompanying drawings.

This invention relates to certain new and useful improvements in indicating or registering mechanism for street-cars, the object of the invention being to provide means for the positive indication or registration of the number of passengers carried by the car or other vehicle on each trip thereof.

Briefly described, the invention comprises a scale mechanism located in the platform of the car and on the platform of which scale mechanism the passenger must step on entering the car. The scale-platform as it is depressed operates the mechanism to indicate or register the entry of a passenger into the car, and as the scale-platform ascends to its normal position the indicator or register is actuated, whereby to be in position for the succeeding indication or registration. Means is provided whereby the passengers must enter the car over one scale-platform and pass out of the car at the opposite end over another scale-platform, thus giving two indications or registrations for record.

In describing the invention in detail reference is had to the accompanying drawings, forming a part of this application, and wherein like numerals of reference indicate like parts throughout the several views, in which—

Figure 1 is a longitudinal horizontal sectional view of a street-car equipped with my improvements. Fig. 2 is a vertical cross-sectional view of a part of a car-platform, showing the scale mechanism in side elevation. Fig. 3 is a transverse vertical sectional view of the scale mechanism and indicator or register. Fig. 4 is a detached view of a part of the indicating or registering mechanism in side elevation. Fig. 5 is a transverse vertical sectional view taken on line 5 5 of Fig. 4. Fig. 6 is a like view taken on the line 6 6 of Fig. 4. Fig. 7 is a similar view taken on line 7 7 of Fig. 4.

As heretofore stated, it is the purpose, in accordance with my invention, to have the passengers enter the car or other vehicle from one end thereof and depart from the car or vehicle at the opposite end. To this end I provide in the car-platforms 1 2 openings 3, located directly in front of the doorways 4, and at the ends of the openings 3 provide vertical side walls 5, so that the persons will be required to pass around to the front of the openings 3 in order to enter through the doorway. In order that the conductor of the car may conveniently enter the latter at any time without passing through the doorways 4, I provide auxiliary doorways 6, which are at each end of the car. I provide an indicating mechanism at each end of the car, though it will be evident that at the discharge end of the car this indicating or registering mechanism may be locked against actuation in any desirable manner. The provision of the mechanism at each end, however, gives a double indication or registration where desired and also provides for the running of the car with either end forward. This indicating or registering mechanism is illustrated in Figs. 1 to 7, inclusive, and comprises a scale-platform 7, which rests normally in the opening 3 of the car-platforms and has two downwardly-extending standards 8, which rest at their lower ends on springs 9, arranged in guides or sockets 10, carried on the bottom of the casing 11, the latter being suitably secured to the supporting-walls 12, attached to the car-platform. The standards 8 are connected together by cross-bar 14, which cross-bar carries an arm 15, projecting through a slot 16 in one of the side walls of the casing 11 and provided on its outer end with a pointer 17, that operates in front of the scale 18, provided on the slotted side face or wall of the casing 11 adjacent to the slot 16. The cross-bar 14 also carries on the side thereof opposite to arm 15 a socket or holder 19, in which is placed a pencil or other marker 20, backed by a spring 21 in the socket or holder 19. Supported by brackets 22 from the bottom of the box or casing 11 is a roller 23, on which is mounted a roll of paper 24, the one end of this roll of paper being carried up through the slot 25, provided therefor in the bottom of the casing 11 over the roller 26 near the upper end of the casing, and connected to a roller 27, carried in brackets 28 on the side wall of the casing 11 near its upper end. The paper strip engages below the roller 26 a plate 29, carried by the inner face of the casing in order to prevent the paper moving away from the pencil or other marker 20. On the shaft 30, which carries roller 27, is loosely mounted a spring-drum 31, the spring 32' of which has its one end connected to shaft 30 and its other end connected to the drum. Attached to the drum is one end of a tape or cord 32, which is passed arround the roller 33, arranged in the slot 34 in the side wall of the casing around the roller 35, carried by the casing, and then upwardly and has its end attached to the holder 19. Keyed on the shaft 30 adjacent to the spring-drum 31 is a ratchet 36, which is engaged by a pawl 37, carried by the spring-drum 31, and on said shaft 30, at the opposite end of the roll 27, is a ratchet 38, which is engaged by the pawl 39, carried by the other of said brackets 28.

The operation of this mechanism is as follows: A passenger entering on platform 1 steps on the scale-platform 7, depressing the same, moving standards 8 downwardly and causing the pencil or marker 20 to mark on the paper strip 24, the length of the mark corresponding to the weight indicated on scale 18. The spring 21 in the holder 19 is of such strength and is of such length and the pencil is also of such length as that the spring when expanded will force the pencil outwardly just far enough to mark firmly on the paper when the pencil is opposite the plate 29, the pencil when it is above the plate either not marking the strip of paper at all, as the paper will be without a firm backing at this point, or else making such a light mark as to be negligible. As the pencil or marker descends the tape or cord 32 is caused to be wound on its spring-drum 31, this drum being loosely mounted on the shaft 30, and as the passenger steps off scale-platform 7 and the latter rises, carrying the pencil or marker therewith, the pawl 37 will engage the ratchet-wheel 36 and rotate the shaft 30, whereby the paper strip 24 is wound on drum 27 and held against unwinding by pawl 39 engaging ratchet 38, the length of the mark made on the paper strip, it will be observed, depending upon the weight of the passenger on scale-platform 7, the pencil making a firm solid line only while it is traveling downwardly over the part of the paper which is stretched in front of the plate 29, the mark made by the pencil on the paper strip above the upper end of the plate being by reason of the paper strip having no backing at that point so light as to be readily distinguishable from the mark made by the pencil on that portion of the paper over the plate 29.

It will be observed that various slight changes may be made in the details of construction without departing from the general spirit of my invention.

Having fully described my invention, what I claim as new, and desire to secure by Letters Patent, is—

1. In combination with a car-platform, provided with an opening, a vertically-movable platform mounted in said opening, a casing suspended underneath the car-platform, standards extending into said casing, with the vertically-movable platform on their upper ends, a cross-bar carried by the standards, and provided with a holder, a marker secured in the holder, an arm carried by the cross-bar and working in a vertical slot provided therefor in the front of the casing, a pointer carried by said arm to coact with a scale on the front of the casing, a marker-plate secured to the inner face of the casing, a strip engaging the marker-plate and engaged by the marker, rolls on which said strip is wound and unwound, and means for winding said strip, substantially as described.

2. In a street-car indicating and recording mechanism, the combination with a car-platform having an opening therein of recording mechanism and indicating mechanism, embodying a casing having a scale on the front thereof, a pointer coacting with the scale, a vertically-moving platform located in the opening in the car-platform and connected to and adapted to move the pointer, a strip of paper, means operable by the movement of the platform for feeding the paper, and a marking-pencil movable by the platform to mark said paper.

In testimony whereof I affix my signature in the presence of two witnesses.

VICTOR ANTONY.

Witnesses:
A. M. WILSON,
E. E. POTTER.